United States Patent [19]
Cohen

[11] Patent Number: 5,673,163
[45] Date of Patent: Sep. 30, 1997

[54] PINCHED-GAP MAGNETIC RECORDING THIN FILM HEAD

[76] Inventor: Uri Cohen, 765 San Antonio Rd., #53, Palo Alto, Calif. 94303

[21] Appl. No.: 315,810

[22] Filed: Sep. 30, 1994

Related U.S. Application Data

[63] Continuation-in-part of Ser. No. 963,783, Oct. 20, 1992.
[51] Int. Cl.$^6$ ..................................................... G11B 5/147
[52] U.S. Cl. ............................................. 360/126; 360/119
[58] Field of Search ..................................... 360/126, 113, 360/122, 123, 125, 119

[56] References Cited

U.S. PATENT DOCUMENTS

| | | | |
|---|---|---|---|
| 4,885,649 | 12/1989 | Das | 360/113 |
| 4,935,832 | 6/1990 | Das et al. | 360/112 |
| 5,012,375 | 4/1991 | Nishimura | 360/119 |

FOREIGN PATENT DOCUMENTS

| | | | |
|---|---|---|---|
| 61-240413 | 10/1986 | Japan . | |
| 62-129923 | 6/1987 | Japan | 360/119 |
| 940967 | 11/1963 | United Kingdom | 360/119 |

*Primary Examiner*—Stuart S. Levy
*Assistant Examiner*—Kevin M. Watkins
*Attorney, Agent, or Firm*—Skjerven, Morrill, MacPherson, Franklin & Friel; David E. Steuber

[57] ABSTRACT

An inductive pinched-gap thin film head (TFH) device having pole-tips which are in substantial contact in two areas, thereby precisely defining a pinched-gap segment. The substantial contact between the pole-tips effectively eliminates all flux lines emanating from the edges and corners during the write operation. The write magnetic field is thus precisely confined to across the pinched-gap segment. As a result, the written medium track width is accurately defined by the width of the pinched-gap segment with high degree of magnetization coherency and virtual elimination of the track-edge noise. The improved (medium) signal-to-noise ratio facilitates substantial increase of the track density. Photolithographic definition and etching of the gap-vias to the bottom pole-tip, followed by deposition of the top pole-tip, facilitates precise and consistent control of the width of the pinched-gap segment (and the written track) down to <1 μm. The inductive TFH device may be fabricated in tandem with a magnetoresistive (MR) read device, with one of the pole-tips of the inductive TFH device being substantially wider than the other pole-tip and serving also as a magnetic shield for the read element in the MR device.

21 Claims, 12 Drawing Sheets

PINCHED-GAP MAGNETIC RECORDING THIN FILM HEAD

This application is a continuation-in-part of pending application Ser. No. 07/963,783, filed Oct. 20, 1992.

BACKGROUND OF THE INVENTION

1. Field of the Invention

This invention relates to magnetic thin film heads (TFH) for recording and reading magnetic transitions on a moving magnetic medium.

2. Background of the Invention

Magnetic TFH transducers are known in the prior-art. See, e.g. U.S. Pat. Nos. 4,016,601; 4,190,872; 4,652,954; 4,791,719 for inductive devices and U.S. Pat. Nos. 4,190,871 and 4,315,291 for magnetoresistive (MR) devices.

In the operation of a typical inductive TFH device, a moving magnetic storage medium is placed near the exposed pole-tips of the TFH transducer. During the read operation, the changing magnetic flux of the moving storage medium induces changing magnetic flux upon the pole-tips and gap between them. The magnetic flux is carried through the pole-tips and back-portion core around spiralling conductor coil winding turns located between the core arms. The changing magnetic flux induces an electrical voltage across the conductor coil. The electrical voltage is representative of the magnetic pattern stored on the moving magnetic storage medium. During the write operation, an electrical current is caused to flow through the conductor coil. The current in the coil induces a magnetic field across the gap between the pole-tips. A fringe field extends into the nearby moving magnetic storage medium, inducing (or writing) a magnetic domain (in the medium) in the same direction. Impressing current pulses of alternating polarity across the coil causes the writing of magnetic domains of alternating polarity in the storage medium. Magnetoresistive (MR) TFH devices can only operate in the read mode. The electrical resistance of an MR element varies with its magnetization orientation. Magnetic flux from the moving magnetic storage medium induces changes in this orientation. As a result, the resistance of the MR element to a sensing electric current changes accordingly. The varying voltage signal is representative of the magnetic pattern stored on the magnetic medium.

Prior-art magnetic recording inductive thin film heads include top and bottom magnetic core pole layers, usually of the alloy Ni—Fe (permalloy), connected through a via in the back-portion area, and separated by a thin gap layer between the pole-tips in the front of the device. The bottom pole-tip is usually designed to be wider than the top pole-tip in order to prevent "wraparound" due to misregistration or misalignment, as taught by R. E. Jones in U.S. Pat. No. 4,219,855. Alternatively, one or both pole-tips are trimmed by ion-milling or by reactive ion etching (RIE) to ensure similar width and proper alignment. Such a technique is disclosed, for example, by U. Cohen et al. in U.S. Pat. No. 5,141,623. As the track width decreases in order to increase the recording density, the write head pole-tips must be very narrow. P. K. Wang et al. describe elaborate schemes to obtain pole-tips for writing very narrow track width, in IEEE Transactions on Magnetics, Vol. 27, No. 6, pp. 4710–4712, November 1991.

One of the problems associated with the prior-art pole-tip designs is that during write operations, substantial noise is introduced along the track-edges (on the magnetic storage medium), which adds to the noise generated by the medium during read operations. During the write operations, significant portions of the intense magnetic flux lines, emanating from the corners and side-edges of the pole-tips, deviate from a direction parallel to the track's length. The non-parallel magnetic field magnetizes the medium in the wrong directions, giving rise to noise along the track-edges. This noise is usually characterized as "track-edge fringing noise" and is a major obstacle to increasing the track density. According to a paper by J. L. Su and K. Ju in IEEE Transactions on Magnetics, Vol. 25, No. 5, pp 3384–3386, September 1989, the track-edge noise extends about 2.5 µm on each side of the written track. In the commonly used conventional merged MR (MMR)( )design, the bottom pole-tip of the inductive write element is also used (or shared) as the top shield for the MR read element. In order to be an effective shield, it must be much wider than the top pole-tip. This further aggravates the track-edge fringing noise introduced by side-writing. The high track-edge noise and wide erase (or write) width produced by the conventional MMR design, limits its usefulness to relatively low track densities. As track density increases, the track width decreases along with the strength of the read-back signal. If the track-edge fringing noise remains the same, then the signal to noise ratio (SNR) is directly proportional to the track width, and deteriorates rapidly as the latter decreases. The current state-of-the-art magnetic thin film media can support lineal density of about 40,000–60,000 flux changes per inch (FCI), corresponding to domain length of about 0.4–0.7 µm. Yet, the track width is at least an order of magnitude larger, about 8–12 µm. There is no apparent reason why the media could not support much narrower tracks, if not for the rapid deterioration of the SNR. By eliminating most of the track-edge fringing noise, the useful track width could be decreased to about 1.0 µm, or less. This represents an increase of recording density by about an order of magnitude.

In addition to the medium's noise, there is also the head's noise. A significant portion of the head's noise is due to edge-closure domains in the pole-tips. This noise contribution becomes more dominant as the width of the pole-tips decreases. This problem was described, for example, by D. A. Herman in Paper No. 299, "Laminated Soft Magnetic Materials", The Electrochemical Society Conference, Hollywood, Fla., October 1989.

SUMMARY OF THE INVENTION

The present invention provides an inductive "pinched-gap" thin film head (TFH) device having pole-tips that are in substantial contact in two areas, thereby enclosing a pinched-gap segment between the areas of substantial contact. The magnetic material in each area of substantial contact is referred to as a "magnetic shunt". Since no magnetic flux lines emanate from the corners and side-edges of the pole-tips, the write magnetic field is precisely confined to across the pinched-gap segment in a direction parallel to the track's length. As a result, the usual noise-producing non-parallel magnetic field from the pole-tips' corners and side-edges is virtually eliminated. The written (medium) track width is precisely defined by the width of the pinched-gap segment. It incorporates a high degree of magnetization coherency and is substantially free of the track-edge noise.

An effective technique to confine the gap includes photolithographic definition and etching gap-vias through the gap to the bottom pole-tip sides or side-edges, followed by deposition of the top magnetic pole. The distance between the gap-vias defines the width of the pinched-gap segment, which in turn accurately and consistently determines the width of the written track. The total width of the pole-tips is not as crucial as in prior-art devices. Either one or both pole-tips may be deposited wider than their final dimension and, following the top pole deposition, trimmed by ion-milling or by reactive ion etching (RIE) to their final width.

Alternatively, one pole-tip (usually the bottom) may be made wider than the other. In the case of the merged MR (MMR) TFH device, for example, the bottom magnetic pole-tip serves also as the top magnetic shield for the MR read element. The latter must be much wider than the top pole-tip in order to be an effective shield for the MR element. It is not necessary to trim the bottom magnetic pole following the deposition of the top magnetic pole and formation of the gap-pinching magnetic shunts. Similarly, a conventional (read/write) inductive TFH device may also be fabricated with one of the pole-tips wider than the other pole-tip. Depositing wider pole-tips improves the composition and thickness uniformities of the device.

Alternatively, intentional wraparound on both sides of the bottom pole-tip also produces a confined gap segment with substantial contact of the pole-tips along their side-edges. Depositing a top pole-tip that is wider than the bottom one readily produces such a wraparound. The width of the pinched-gap segment (as well as the track width) is determined by the width of the bottom pole-tip. Incomplete step coverage by the gap layer at the side-edges of the bottom pole-tip provides substantial contact there. To ensure contact along the upper corners of the bottom pole-tip, they can be exposed by ion-milling (with a thin mask) or by etching gap-vias prior to the deposition of the top pole. Excess width of the top pole-tip on both sides of the bottom pole-tip can be trimmed by ion-milling, RIE, or by chemical etching.

Although the pinched-gap transducer's efficiency is not adversely affected in the write operation, it may be impaired in the read mode due to the partial shorting of the pole-tips. A dual-element or tandem (one on top of the other) TFH device, combining a pinched-gap TFH device as a write element, and a separate TFH device as a read element may be advantageous. The pinched-gap TFH device is particularly suitable for use as a write element in combination with a separate read element, such as a magnetoresistive (MR) element, or another inductive TFH element optimized for the read operation. Much of the head's noise, such as Barkhausen pop-corn noise, or glitch after write, is related to the write operations. In a dual-element device combining the pinched-gap as the write element, such noise is irrelevant since it does not interfere with the read-back and verification operations. These functions are executed by the separate read element. Also, the pinched-gap TFH device exhibits less noise due to the elimination of the edge-closure domains in the pole-tips. This is particularly true when the pinched-gap device is used in the write mode, but it is also effective in the read mode. Combining a pinched-gap write element with an MR read element is particularly advantageous, especially for high density small form disk drives. However, the fabrication of the additional MR element is highly complex and very costly. A simpler and more economic solution is to fabricate a separate inductive TFH element, optimized for the read operation.

The read and write TFH elements can preferably be situated or placed side-by-side on the same rail (or air bearing surface) or on different rails of the slider. Such a layout requires a fixed-translation of the slider to position the read element over the written track after a write operation. However, such a short translation takes only a very short time. Alternatively, multiple sliders per disk surface, attached to separate actuators, can be positioned in such a way that the read element of the second slider follows directly behind the track of the first slider's write element. Such a track-following scheme minimizes the time lapse between a write and a read-back or verification operations. These fixed-translation and track-following schemes can also apply for a dual element or tandem combination of an inductive write element and an MR read element.

The pinched-gap TFH device of this invention may also be used with contacting heads, such as in magnetic tape recording devices or contact recording disk drives. Such heads may be positioned in sliders having one or more sliding rails.

An object of this invention is to provide a pinched-gap TFH device for writing media tracks virtually free of track-edge noise.

Another object is to provide a pinched-gap TFH device having accurately and consistently defined narrow pinched-gap segment and capable of writing narrow tracks, down to $\leq 1$ μm.

An additional object is to decrease the head's noise by reducing the edge-closure domains along the side-edges of the pole-tips.

Another object of the invention is to provide methods for making the pinched-gap TFH device.

A still further object of this invention is to provide a dual-element TFH device with a pinched-gap write element and an MR or inductive TFH read element.

Another object is to provide a pinched-gap TFH write element combined in tandem with an MR read element.

An additional object is to provide a pinched-gap TFH write element as part of a tandem merged MR (MMR) device.

An additional object is to provide a dual-element TFH device having the read and write elements placed side-by-side on the same rail (or air bearing) or on separate rails of the slider.

A further object of the invention is to provide a fixed-translation procedure for a read-back or verification of a written track, using the dual-element TFH device with side-by-side elements on the same rail or on separate rails of the slider.

Another object is to provide a track-following scheme for multiple actuators having more than one head per disk surface, to minimize the time lapse between the write and read-back or verification operations.

DESCRIPTION OF THE PREFERRED EMBODIMENTS

Figure 1:
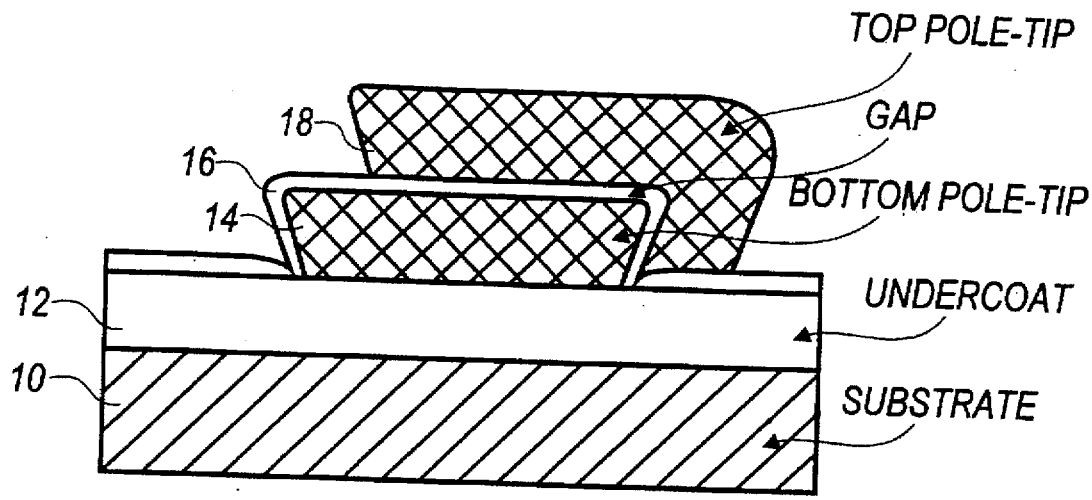
FIG. 1 shows a prior-art wraparound top pole-tip, as seen from the air bearing surface (ABS).

FIG. 1 shows an air-bearing surface (ABS) view of a frequently occurring "wraparound" situation due to misregistration or misalignment of prior-art pole-tips of similar width. The head is usually formed upon a non-magnetic wafer substrate 10 comprising a ceramic compound such as $Al_2O_3$-TiC, and a non-magnetic, insulating undercoat 12 consisting usually of $Al_2O_3$. The magnetic top pole-tip 18 wraps around one edge of the bottom magnetic pole-tip 14. The magnetic core poles consist of a ferromagnetic material having a low coercivity and high saturation and permeability, such as permalloy Ni—Fe. A non-magnetic gap layer 16, consisting usually of $Al_2O_3$, separates pole-tips 14 and 18. Due to incomplete step coverage by gap layer 16 over the side-edges of bottom pole-tip 14, the two pole-tips may contact or short (or virtually short) at the wraparound site. The wraparound situation is predominant when the top pole-tip is wider than the bottom one.

Figure 2:
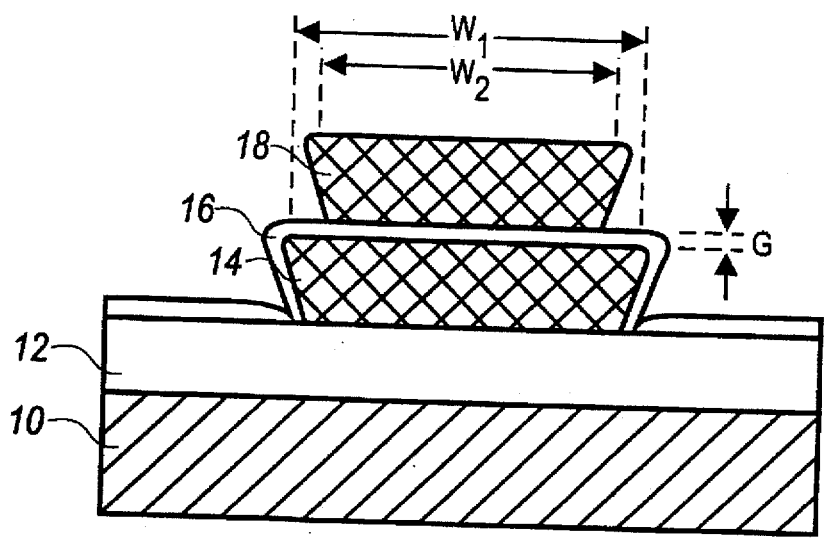
FIG. 2 shows a prior-art configuration, with the bottom pole-tip being wider than the top pole-tip.
Figure 3A:
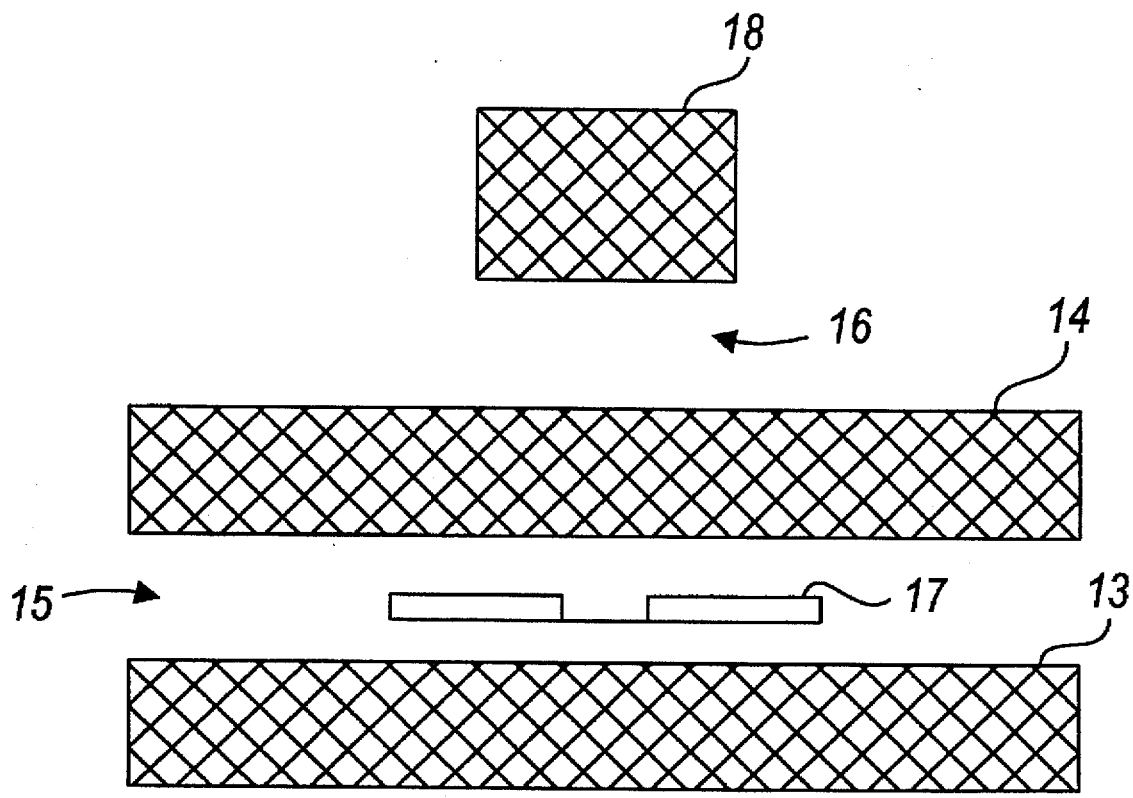
FIG. 3a shows a prior-art configuration of a tandem merged MR (MMR) device with the bottom pole-tip wider than the top pole-tip.
Figure 3:
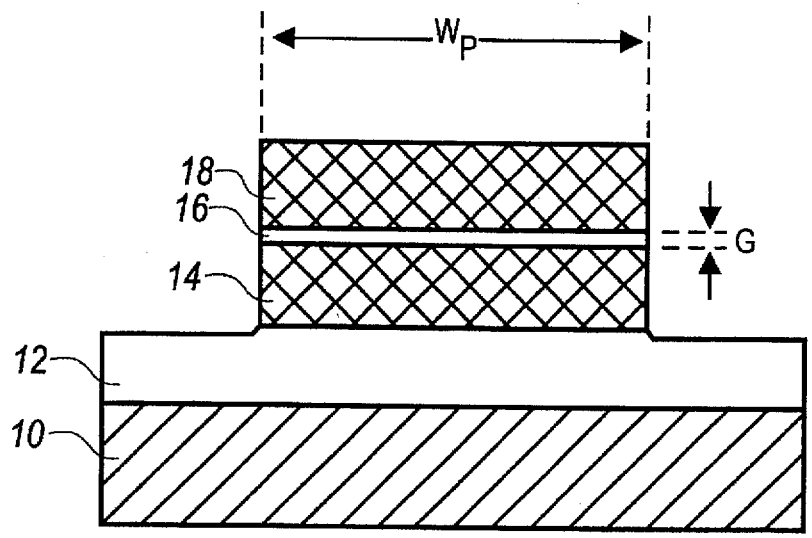
FIG. 3 shows a prior-art ion-milled bottom pole-tip.

U.S. Pat. No. 4,219,855 discloses a TFH device with pole-tips having unequal widths, as shown in FIG. 2. The wider bottom pole-tip helps to prevent the wraparound situation. The difference in width between the two pole-tips is typically about 3–5 μm. Track-edge noise, introduced by non-parallel (to the track's length) magnetic field emanating from the corners and side-edges of the pole-tips during the write operation, is very significant when the width of the pole-tips is unequal. Also, the written track width is ill-defined, and varies with the write current and the alignment of the pole-tips. As track width decreases to allow for higher track density, such a difference becomes unacceptable, and other schemes allowing for pole-tips having more equal widths become more prevalent. One or both pole-tips can be trimmed by ion-milling or by reactive ion etching (RIE) to ensure similar width and proper alignment. An example of ion beam pole-trimming is disclosed in U.S. Pat. No. 5,141,623, as shown in FIG. 3. Although pole-trimming significantly improves (or decreases) the feasible track width, there is still substantial track-edge noise introduced by the non-parallel write magnetic field emanating from the corners and side-edges of the pole-tips. The side-writing problem is particularly serious in the conventional merged MR (MMR) device shown in FIG. 3a. (In FIG. 3a, the substrate and the undercoat are omitted for simplicity.) Bottom pole-tip 14 is also shared (or merged) as the top magnetic shield for the MR read device, which also includes an MR read element 17, a read-gap 15 and a bottom magnetic shield 13. In order to be an effective shield, bottom pole-tip/top magnetic shield 14 must be much wider than the top pole-tip 18. As a result, side writing and erase width are large and sensitive to the amplitude of the write current.

Figure 4:
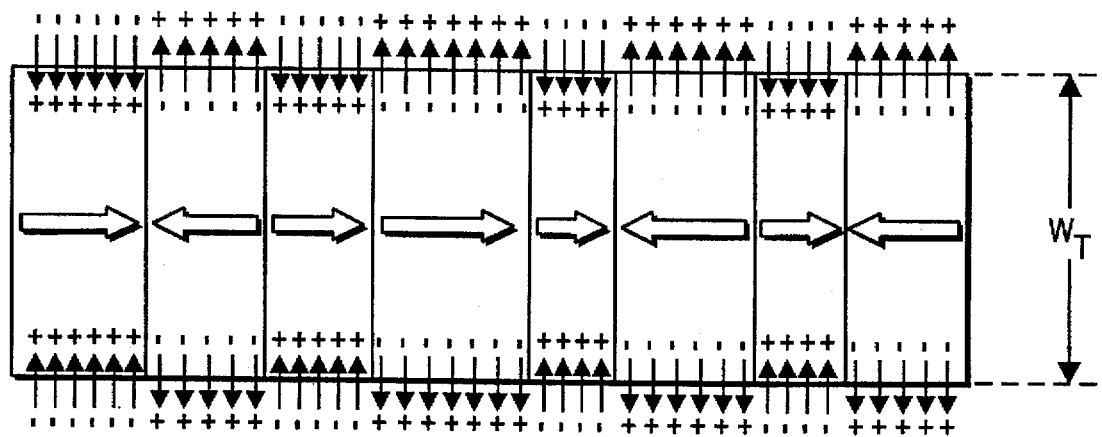
FIG. 4 is a schematic view of a prior-art written track with track-edge fringing noise.

FIG. 4 shows schematically the resulting written track and associated track-edge noise, obtained by using prior-art inductive TFH heads.

Figure 5:
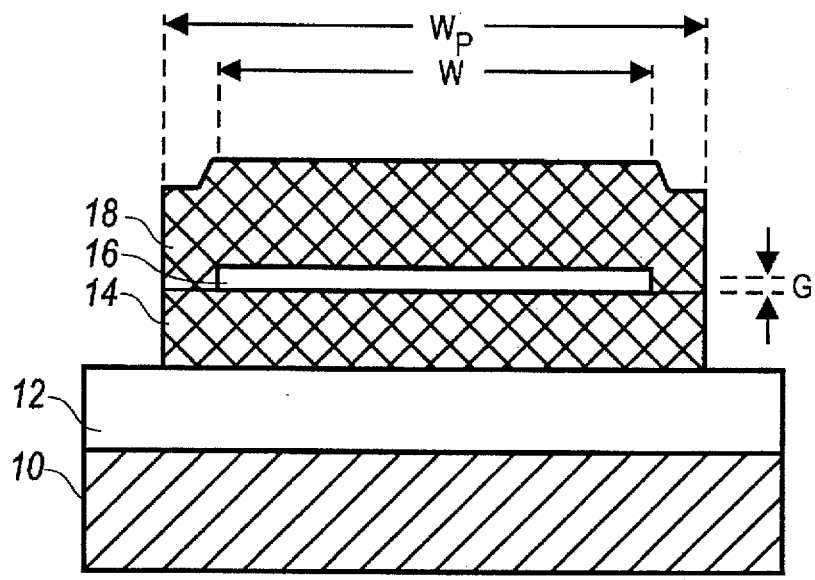
FIG. 5 shows a pinched-gap and pole-tips, as seen from the ABS, according to a preferred embodiment of this invention.

FIG. 5 shows a preferred embodiment according to this invention. Areas of substantial contact are established between the bottom pole-tip 14 and top pole-tip 18, thereby "pinching" or confining a gap segment 16. The width of the pinched-gap segment, W, is the lateral distance between the areas of the pole-tips that are in substantial contact, and the thickness of the pinched-gap segment, G, is the vertical distance between the pole-tips. In the preferred embodiment bottom pole-tip 14 and top pole-tip 18 are in actual physical contact. However, this is not absolutely necessary, and in other embodiments a small "gap" may separate the bottom and top pole-tips. This small "gap" or separation should be small enough to prevent the magnetic flux lines from emanating significantly from the pole-tips in those regions. The separation of the pole-tips in the areas of substantial contact should not exceed about 25% of G, and preferably be less than 5% of G, the thickness of the gap layer between the pole-tips across the pinched-gap segment. Preferably the structure illustrated in FIG. 5 should extend all the way up the pole-tip to zero throat height, the point where the poles begin to diverge, and also where the back-portions (not shown) begin.

Figure 5A:
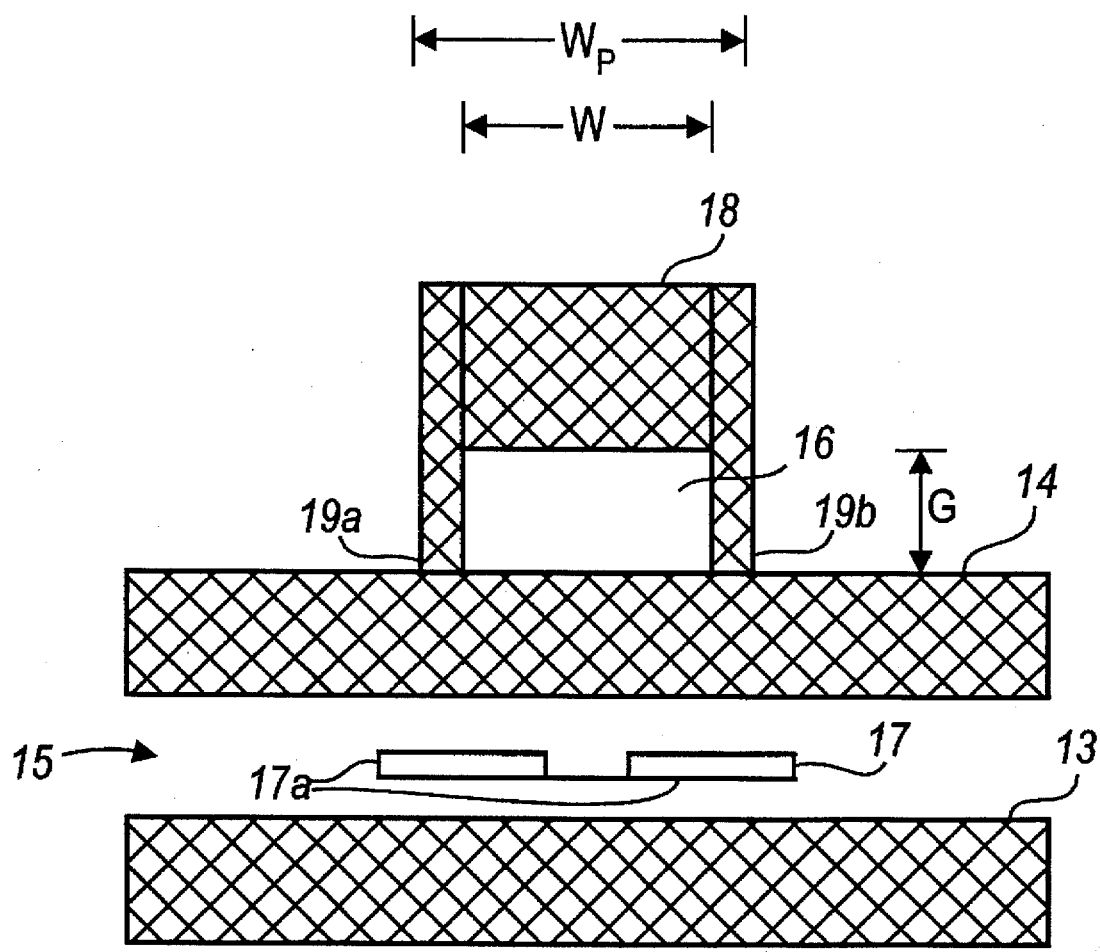
FIG. 5a shows a pinched-gap write element combined with an MR element in an MMR configuration, according to a preferred embodiment of this invention.

FIG. 5a illustrates another embodiment of the invention in which a pinched-gap write element is combined in a merged MR (MMR) structure. Bottom pole-tip 14 of the write element is also used for (or shared) as the top magnetic shield of the MR read element. MR element 17 and electrical contacts and/or track-defining contacts 17a are located inside read-gap 15. Write-gap 16 is the pinched-gap segment confined between magnetic shunts 19a and 19b, which provide substantial contact between top magnetic pole-tip 18 and bottom magnetic pole-tip/top shield 14.

As used herein, the term "substantial contact" includes actual physical contact between the pole-type as well as a condition in which there is a small gap between the pole-tips such that the magnetic reluctance between the pole-tips is substantially reduced and the magnetic flux lines are therefore prevented from extending from the area of substantial contact contact to a degree that significant track edge noise is created.

While gap 16 in FIGS. 5 and 5a is formed of $Al_2O_3$, it may alternatively be formed of any non-magnetic material, including $SiO_2$, SiO or $SiN_x$ and non-magnetic metals such as Cu, Al, Ag or Au. Pole-tips 14 and 18 are preferably formed of Ni—Fe but may also be formed of other ferromagnetic materials such as ferrites, sandust (Fe—Ai—Si), Co—Fe, Co—Ni—Fe, Co—Zr, Co—Nb—Zr, Co—Ta—Zr, Co—Mo—Zr, Co—W—Zr, Fe—N, Fe—Al—N, Fe—Si—N, and laminated poles comprising ferromagnetic layers alternating with non-magnetic layers. The gap-pinching magnetic shunts 19a and 19b of FIG. 5a may consist of the same soft ferromagnetic material(s) used for forming the pole-tips 14 and 18 or they may comprise other soft ferromagnetic material(s). For simplicity of fabrication, it is convenient to form shunts 19a and 19b of the same material used for the top pole-tip 18. However, other ferromagnetic materials may be more suitable for the shunts, in order to better match the shunt reluctance to that of the pinched-gap segment 16, for optimum performance of the device. Different ferromagnetic materials may be used to construct top and bottom pole-tips 14 and 18. The relative reluctances are also determined by geometrical dimensions such as the cross-sectional area of shunts 19a and 19b and their length versus the cross-sectional area and length (thickness) of the pinched-gap section 16. Reluctance is proportional to the length and inversely proportional to permeability and cross-sectional area. At relatively low shunt reluctance, a large fraction of the magnetic flux will be shunted, thus adversely affecting the obtainable magnitude of the write field across the pinched-gap segment 16. On the other hand, an excessively high shunt reluctance may not be capable of effectively eliminating the side write field. An optimum balance or reluctance matching may be required for different pinched-gap segment and pole-tip geometries. It should be noted that while the permeability of the gap material is constant ($\mu=1$) with the magnetic flux density (B), the permeability of the soft ferromagnetic shunt material is very high at low flux density ($\mu>1,000$) and approaches unity as flux density approaches saturation. Thus if the total flux is low, most of the flux will be channeled through the shunts 19a and 19b. As the total flux increases (by increasing the write current and/or the number of coil turns), the reluctance of the shunts 19a and 19b will increase, forcing a larger fraction of the flux to be directed over the pinched-gap segment 16 and thereby increasing the write field there.

In the pinched-gap TFH device, the length of the shunts 19a and 19b is equal to the length (or thickness) G of the pinched-gap segment 16. The cross-sectional area of each shunt is determined by its width, $(W_P-W)/2$, multiplied by its depth. The shunt depth may extend over the entire throat height, from the front ends of the pole-tips to zero throat (where the poles begin to diverge), or the depth may be shorter. In the latter case, the shunt depth extends from the front ends of the pole-tips to some positive throat height. Although it is more convenient to fabricate the gap-pinching shunts with the entire throat height depth, it may be advantageous to fabricate them with shorter depth. Shorter shunt depth increases their relative reluctance versus that of the pinched-gap segment. Similarly, decreasing the shunt width will increase their relative reluctance. In order to ensure adequate write field of the pinched-gap TFH device, sufficient flux must reach the pole tips without saturation anywhere else in the device. In particular, it is important to maintain the pole-tips' thickness larger than the throat height and, preferably, at least twice as large. Also, the back via connecting the top and bottom yokes should be wide enough to avoid saturation.

To facilitate the closure of the pole-tips, vias can be defined by photolithography and etched through the gap layer to delineate the contact areas. After depositing the top magnetic pole, the pole-tips contact each other through the gap-vias. Either one or both pole-tips can then be trimmed by ion-milling or by RIE to define their final width, $W_P$. Using photolithographic definition of the gap-vias, it is possible to accurately and consistently control the width of the pinched-gap segment, W, down to $\leq 1$ µm. The gap-vias to the bottom pole-tip can be defined and etched at the same time during the formation of the back-portion closure gap-vias, by using a proper mask, to save processing steps. Otherwise, they can be done separately with separate masks. Definition and etching of the gap-vias can be performed at any stage following the deposition of the gap layer. However, it is preferable to postpone these operations until after the completion of all the coil and insulation layers and studs (if used), until just prior to the deposition of the top magnetic pole. This prevents attack on and/or contamination of the vias and the exposed bottom pole areas by the numerous processing steps.

Figure 6:
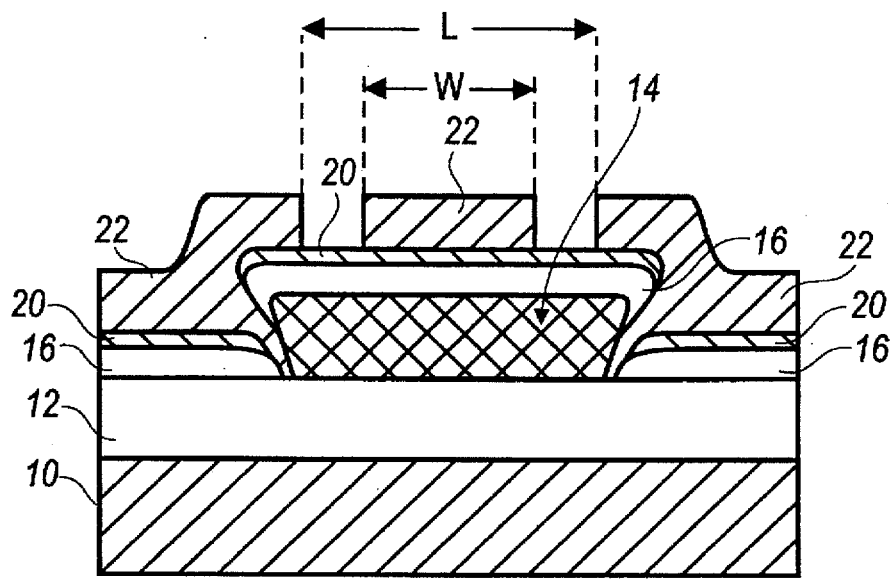
FIG. 6 illustrates a technique for photolithographic definition and etching of gap-vias to confine a pinched-gap segment, according to a preferred embodiment of the invention.

FIG. 6 illustrates an effective technique for lithographic definition of the pinched-gap segment, according to a preferred embodiment of this invention. The figure shows the stage after a photoresist layer 22 has been coated and patterned by exposing through an appropriate mask and development. W is the lateral distance between the inside-edges of the vias, and L is the distance between the outside-edges of the vias. Prior to coating the photoresist layer, a thin metallic layer 20 was deposited over gap layer 16. The purpose of metallic layer 20 is to provide an improved etch mask for the gap-vias. Although a photoresist mask alone is compatible with a gap-etchant based on phosphoric acid (diluted with water to a volume ratio of about 1:1, and operated at 60°–80° C.), the etching rate is rather slow and non-uniform. It is very sensitive to the aspect ratio of the mask features and to the flow pattern and rate of the etchant. Small opening features (with high aspect ratio) etch slower than larger ones. Also, once the gap is etched away this etchant begins to attack the underlying permalloy bottom pole 14. In particular it attacks defective spots in the permalloy, creating deep craters in the exposed areas under the gap-vias. A preferable gap-etchant is based on dilute HF in water. It provides faster and much more uniform etching, since it is less sensitive to the aspect ratio and flow pattern or rate. However, photoresist mask 22 alone may not be sturdy enough when using such an etchant. The latter attacks rapidly the interfacial bond between the photoresist and the alumina gap layers, if no metallic layer is interposed between them. The rapid lateral attack results in severe undercutting and occasional lift-off of the photoresist layer during the gap-etching operation.

Metallic layer 20 must have good adhesion to gap layer 16, and must be substantially immune against attack or etching by the gap-etchant. Metallic layer 20 can be deposited by a vacuum technique, such as sputtering or evaporation. It may comprise a metal selected from the group Ni—Fe, Cr, W, Ta, Mo, Nb, V, and alloys comprising one or more of these metals. It may also include metals with weaker adhesion to the gap, such as Cu, Au, Ag, Pd, Pt, Rh, Ir, or alloys comprising one or more metals thereof, particularly if they are preceded by a metal layer with stronger adhesion to the gap, such as Cr. The thickness of this layer can be as low as 30–50 Å, and preferably be in the range 100–300 Å. In the preferred embodiment, metallic layer 20 comprises a single permalloy (Ni—Fe) layer with thickness between 100–300 Å.

The pattern of the vias is next transferred to metallic layer 20 by etching with a selective etchant through photoresist mask 22. This etchant must be compatible with the photoresist mask, and should not significantly attack or etch gap layer 16. In the preferred embodiment, a selective etchant for the Ni—Fe layer 20 comprises nitric acid, phosphoric acid, and water in a volume ratio of 1:1:8, as described in U.S. Pat. No. 5,059,278, incorporated herein by reference.

Following the etch-transfer of the via pattern to metallic layer 20, gap-vias are etched through the reinforced mask (combining both metallic layer 20 and photoresist 22). An adequate gap-etchant consists of dilute HF in water:

| Hydrofluoric Acid (48%) | HF | 1 volume |
|---|---|---|
| Water | $H_2O$ | 9 volumes |

This corresponds to 10% concentration by volume (v/v), or to 4.8% by weight (wt %). The etchant is operated at room temperature with moderate agitation or spraying. The etch rate increases by raising the temperature or the HF concentration. The operating temperature can be in the range 10°–90° C., and preferably at room temperature, for convenience. The etchant may comprise HF and water in concentration range 5–25% v/v of concentrated (48%) HF (2.4–12.0 wt. % of HF), and preferably in the range 8–15% v/v of concentrated (48%) HF in water (3.8–7.2 wt. % of HF). Other chemicals, such as alcohols or ethylene glycol, may also be added to or substituted for all or a portion of the water.

Following the etching of the gap-vias, photoresist layer 22 is removed using a conventional stripping method. Next, metallic layer 20 is removed by a wet chemical etching or by a dry etching technique such as sputter-etching or ion-milling. In the first case, it may be removed by the same wet etchant which was previously used to pattern this layer. If this etchant can also attack the bottom magnetic pole 14, then it may be advantageous to use one of the dry etching techniques. In either case, keeping the thickness of layer 20 to a minimum ensures minimal attack on layers 14 and/or 16 during the removal of metallic layer 20. In the preferred embodiment, the Ni—Fe layer 20 is removed by a brief sputter-etching or ion-milling step. Alternatively, if metallic layer 20 consists of permalloy, and the gap-vias are etched just prior to the deposition of the top (permalloy) magnetic pole, then layer 20 can be left in place to become a part of the magnetic pole. If layer 20 consists of a different metal or alloy than the pole(s), then it is preferentially removed by a selective wet chemical etchant which does not attack either layer 14 or 16. When the top magnetic pole is deposited, it makes physical contacts to the bottom pole-tip through the gap-vias. A pinched (or confined) gap segment with a well-defined width, W, is thus constructed. The excess width of one or both pole-tips can be trimmed by ion-milling or by RIE to their final width, $W_P$, to produce the structure of FIG. 5.

In another embodiment, bottom pole-tip 14 is originally patterned wider than the top pole-tip 16, so that $W_1 > W_2$, where $W_1$ is the bottom pole-tip's width and $W_2$ is the top width of the pole-tips width. The latter is equal to the final width of the pole-tips, $W_P$, which is in the range $W < W_2 = W_P < L$, as shown in FIG. 6. Following the top pole deposition, the excess width of the bottom pole-tip (over $W_P$) is trimmed by ion-milling or by RIE, in accordance with U.S. Pat. No. 5,141,623, incorporated herein by reference. The lithographic etching technique is highly precise and accurate and can consistently produce a pinched-gap segment with a width $W \leq 1$ μm.

Figure 7:
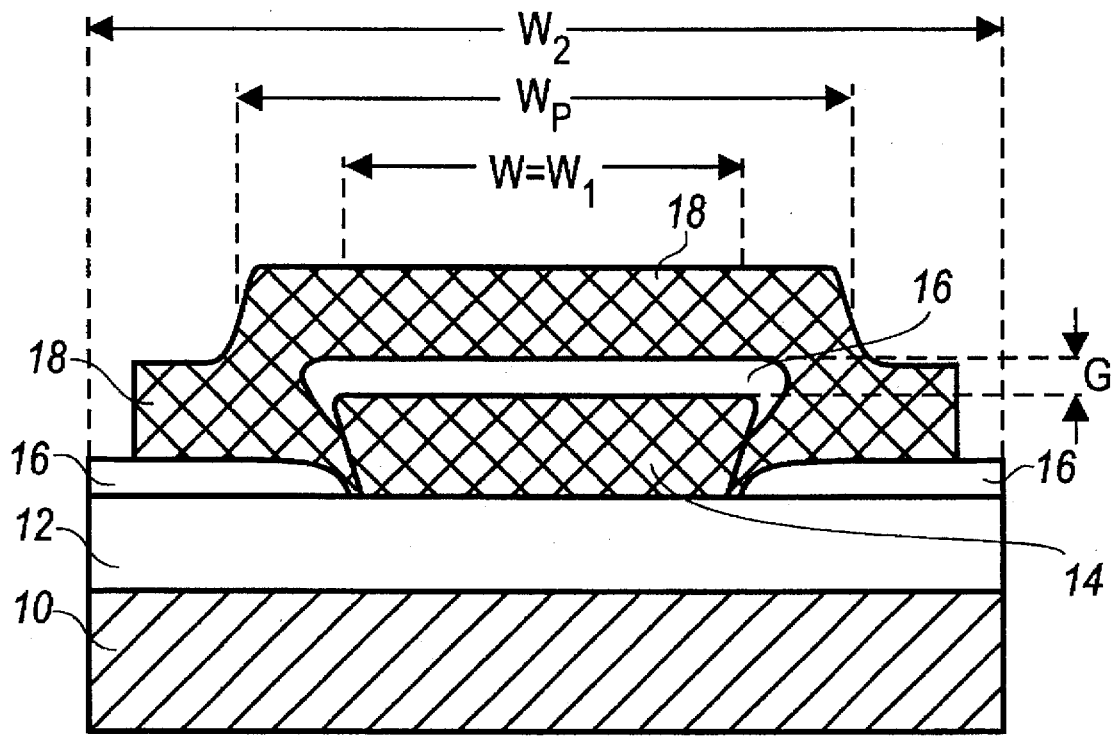
FIG. 7 shows wraparound on both sides producing a confined gap segment with virtual shorting along the side-edges of the bottom pole-tip.
Figure 8:
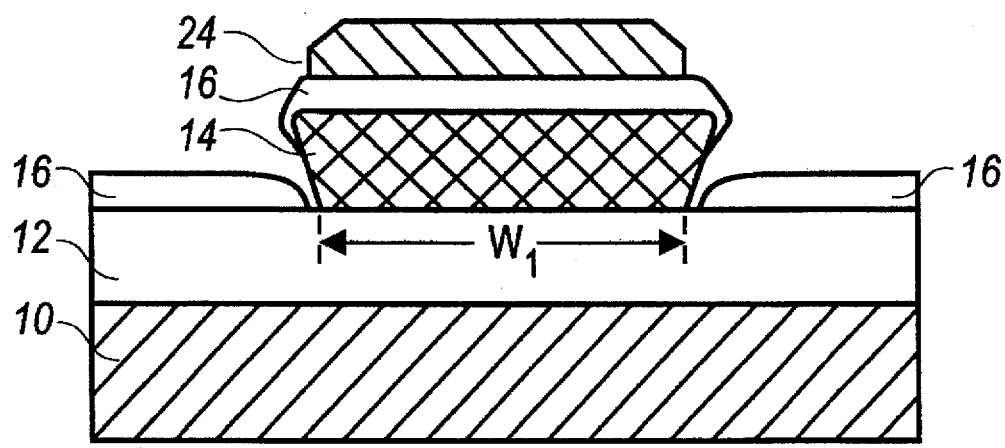
FIG. 8 illustrates thin ion-milling mask faceting, exposing the top corners of the bottom pole-tip, to facilitate pinching of a gap segment by wraparound.
Figure 9:
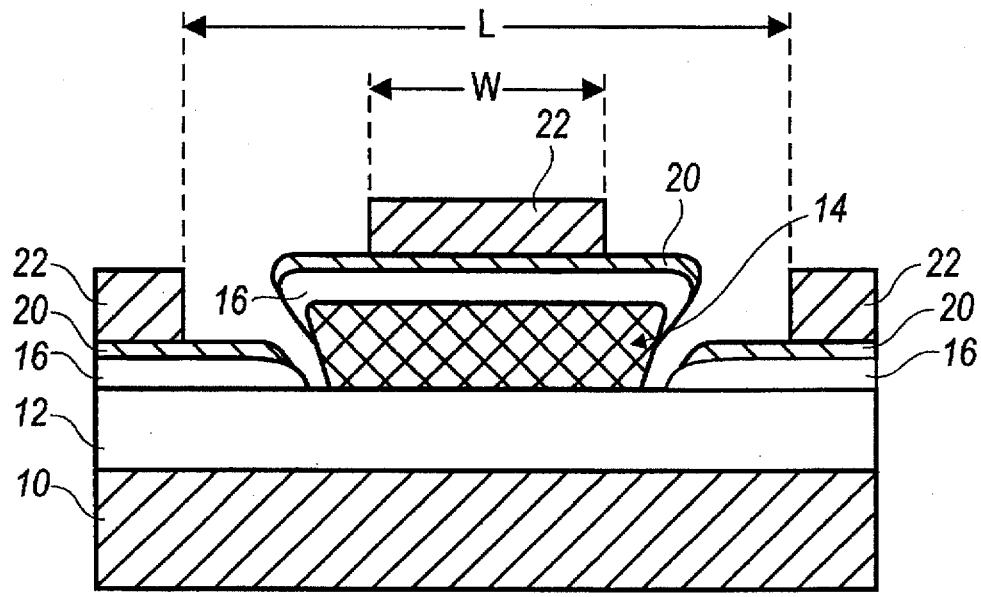
FIG. 9 illustrates an alternative embodiment using photolithographic definition and etching of gap-vias combined with wraparound to confine a pinched-gap segment.

In another embodiment, wraparound on both sides of the bottom pole-tip produces a confined or a pinched-gap segment with substantial contact along the side-edges of the bottom pole-tip. Depositing a wider top pole-tip than the bottom one, readily produces such wraparound on both sides, as shown in FIG. 7. Due to incomplete step coverage by the gap layer around the side-edges of the bottom pole-tip, substantial contact is accomplished there after deposition of the top pole (see Example 2). Excess width of the top pole-tip can be trimmed by ion-milling or by RIE. To ensure consistent contacts along the side-edges and upper corners of the bottom pole-tip, they can be exposed by a brief ion-milling using a thin etch mask, as shown in FIG. 8. Due to faceting, the thin etch mask is consumed faster at its edges, exposing the gap at the pole-tip's corners and side-edges to the ion-milling process. Alternatively, gap-vias can be lithographically defined and etched along the side-edges of the bottom pole-tip, as shown in FIG. 9. The width of the pinched-gap segment, W, is equal to the width of the bottom pole-tip, $W_1$, in the cases of FIGS. 7 and 8, and to the lateral distance between the vias in the case of FIG. 9. Again, the excess width of the top pole-tip on both sides of the bottom pole-tip can be trimmed to its final width by ion-milling, RIE, or by chemical etching.

Figure 10:
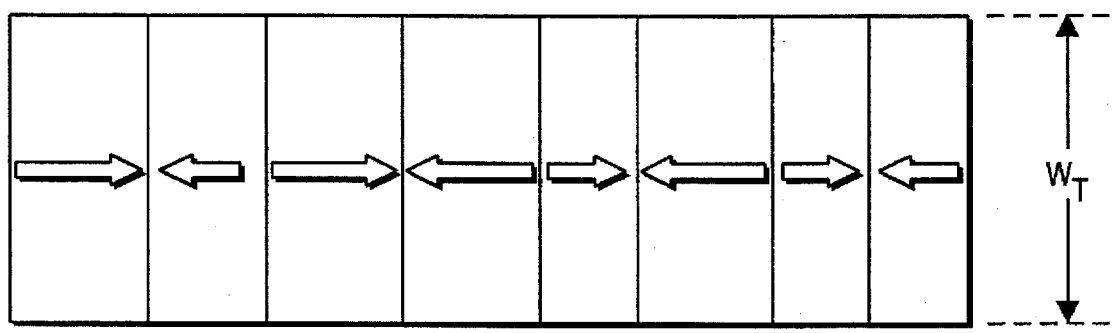
FIG. 10 shows a schematic of a written track with no track-edge fringing noise, obtained by using a pinched-gap TFH device.

FIG. 10 shows schematically a (medium) track written with a pinched-gap inductive TFH head. The track boundaries are precisely defined and its width, $W_T$, is substantially equal to the width of the pinched-gap segment, W. It may be slightly wider (by a small fraction of one micrometer), due to a diverging write field in the space between the pole-tips and the (medium) magnetic layer. The smaller this space, the smaller is the difference between W and $W_T$. For the state-of-the-art flying height, $d < 1,000$ Å, the width of the written track $W_T$ is substantially the same as the width of the pinched-gap segment, W. This is in sharp contrast to tracks written by prior-art TFH devices (shown in FIG. 4), where $W_T$ is wider than W by several micrometers. The track-edge noise of the latter is created by the non-parallel write magnetic field emanating from the corners and side-edges of the conventional TFH devices. The non-parallel magnetic field also widens the track width, causing the track edges to be blurred and indefinite.

The shorted pole-tips do not adversely affect or reduce the desirable magnetic field across the pinched-gap segment during a write operation, since it is a common practice to saturate the pole-tips during this stage. The only emanating flux lines between the pole-tips are confined to across the pinched-gap segment. The flux lines thus substantially comprise only the desirable direction parallel to the track's length. Although the pinched-gap transducer's efficiency is not adversely affected in the write mode, it may be impaired in the read mode. The read efficiency loss is proportional to $(W_P - W)/W_P$, where $W_P$ is the total width of the pole-tips and W is the width of the pinched-gap segment. The excess width of the pole-tips $(W_P - W)$ should be kept to a viable minimum. A practical range for the excess width is $0.03 P_T \leq (W_P - W) \leq 2.0 P_T$, where $P_T$ is the thickness of the top pole-tip.

It is preferable to use the pinched-gap TFH device in combination with a separate read element, such as a magnetoresistive (MR) element, or a separate inductive TFH element optimized for the read operation. A combination with an MR read element is preferable, especially for high density small form disk drives. A particular combination is a merged MR read element, where the bottom pole-tip of the pinched-gap write element is merged (or shared) with the top magnetic shield of the MR read element. However, the fabrication of the additional MR element is highly complex and very costly. A simpler and more economic solution is to fabricate a separate inductive TFH element with conventional pole-tips, optimized for the read operation. A single head, incorporating the pinched-gap TFH device of this invention, can be used to perform both the write and the read functions. However, due to the reduced read efficiency of the pinched-gap device, it is preferable to use separate heads (or elements), each of which is optimized to perform a single function.

Figure 11:
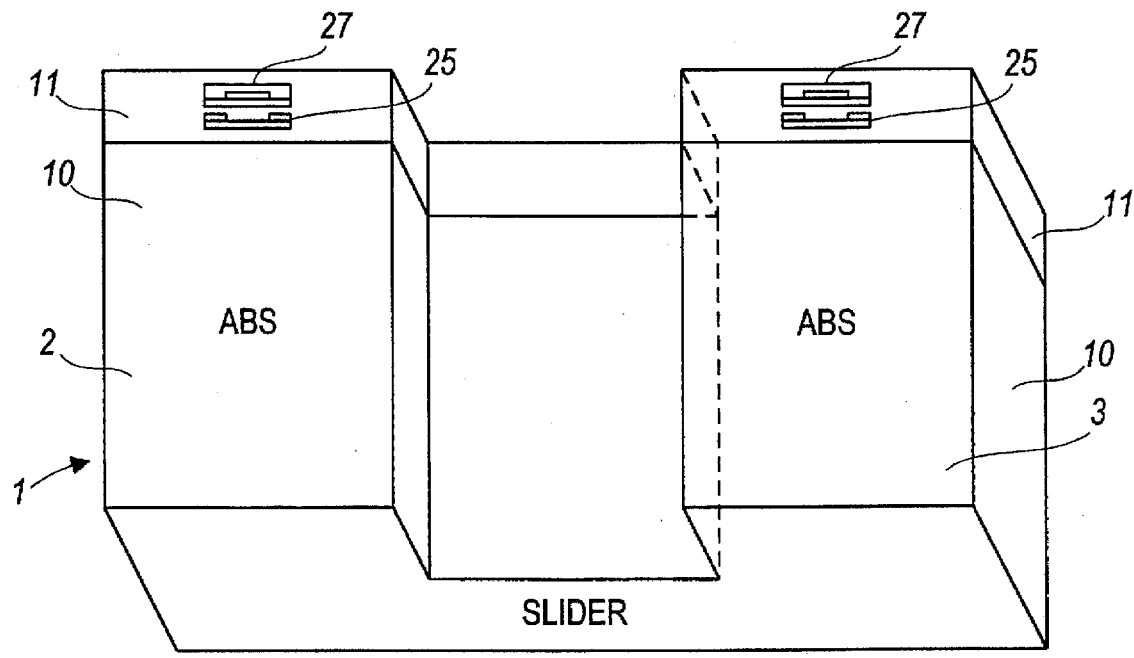
FIG. 11 illustrates a dual-element pinched-gap write element placed on top of an MR read element, as seen in perspective from the air bearing surface (ABS).
Figure 12:
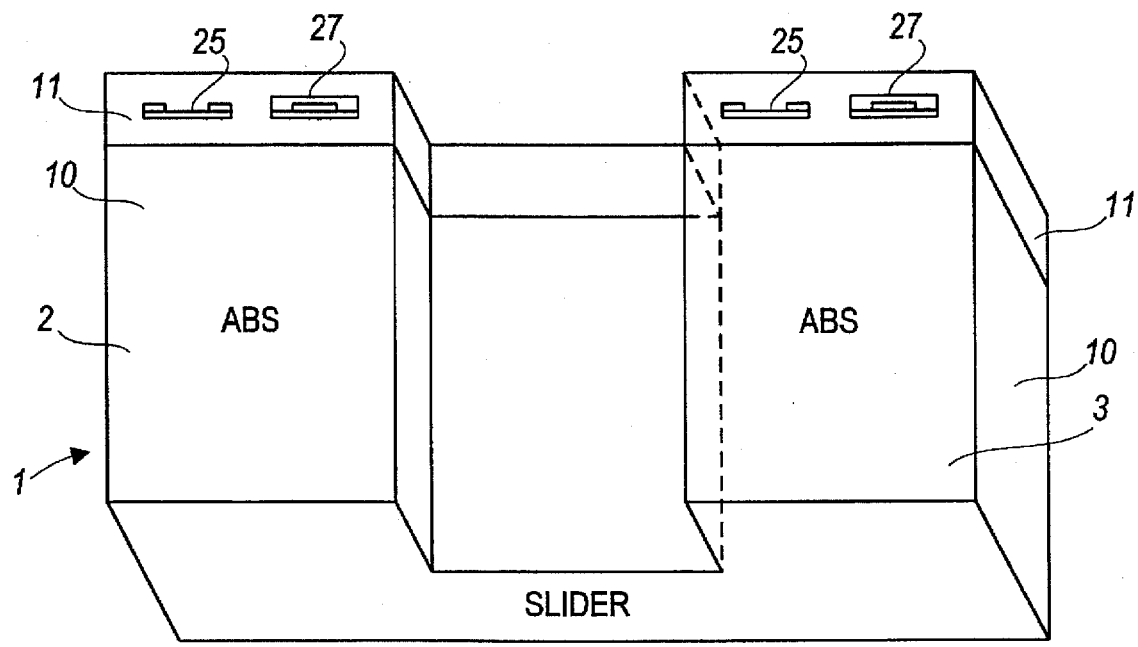
FIG. 12 illustrates a side-by-side dual-element comprising a pinched-gap write element and an MR read element on the same rails, as seen in perspective from the ABS.
Figure 13:
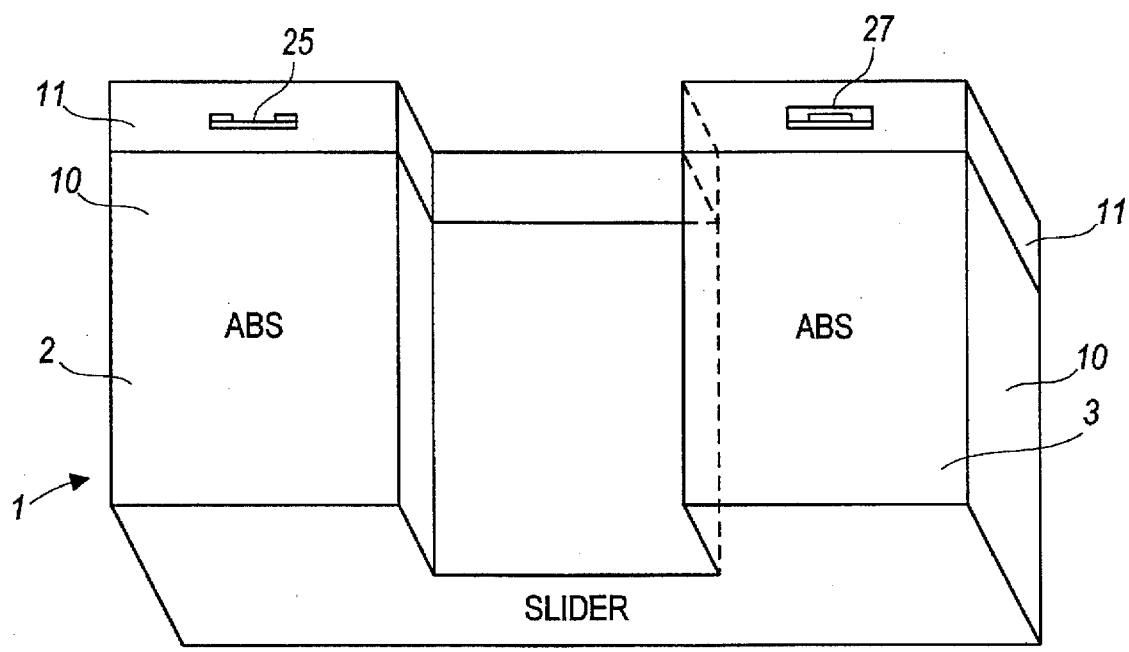
FIG. 13 illustrates a dual-element comprising a pinched-gap write element and an MR read element placed on separate rails, as seen in perspective from the ABS.

The separate write and read elements can be situated or placed one on top of the other or in tandem with respect to the recorded track, side-by-side on the same rail (or air bearing surface), or on separate rails of the same slider. FIG. 11 illustrates the placement of a pinched-gap write element 27 on top of an MR read element 25, as seen in perspective from the air bearing surface (ABS). The substrate 10 is shaped into a slider 1, including rails 2 and 3, and alumina 11 serves as undercoat, gap material, and overcoat. Placing an inductive write element in tandem with an MR read element is a common practice. Magnetic shield layers (not shown) are required between the elements to prevent magnetic and electrical interferences. However, the fabrication process is highly complex, with low throughput and yield, and with high manufacturing cost. Placing inductive write and read elements in tandem with each other (as in U.S. Pat. No. 4,219,853 by Albert et al.) suffers serious drawbacks. The two elements interfere magnetically and electrically with each other, and the fabrication process is very long, complex, and costly. The two elements can preferably be placed side-by-side on the same rail (or ABS), or on separate rails of the slider. FIGS. 12 and 13 illustrate the placement side-by-side on the same rail, and on separate rails, respectively, of a pinched-gap write element and an MR read element. A pinched-gap TFH write element can be placed similarly relative to an inductive TFH read element. Such configurations require a fixed-translation scheme for the TFH slider to position the read element over the written track for a read-back or verification operations after a write operation. The fixed-translation is in a plane parallel to the medium surface and in a direction essentially normal to the track's length. The fixed-translation takes only a very short time.

Alternatively, multiple TFH sliders per medium surface, attached to separate actuators, are positioned in such a way that the read element of one slider follows behind the written track of another slider's write element. Such a track-following scheme minimizes the time lapse between a write operation and read-back or verification operations and is faster than any of the current state-of-the-art configurations. Also, the track-following scheme completely eliminates all interference between the write and read elements.

Placement of the write and read elements either side-by-side on the same rail, or on separate rails, has the advantages of much simpler, faster, and less costly fabrication. In addition, electrical and magnetic interference are substantially eliminated in such configurations. It is also possible to construct multiple pairs of write and read elements on separate rails (see FIG. 12). Each pair comprises a pinched-gap write element and a read element placed side-by-side on the same rail of a TFH slider. Such a configuration can significantly improve device yield, by redundancy, or multiply the data transfer rate of a disk-drive by utilizing simultaneous (or parallel) multiple channels.

The shorted sides or edges of the pole-tips in the pinched-gap device virtually eliminate the edge-closure domains in the pole-tips, thereby improving significantly the head's SNR. Edge-closure domains are described, for example, by D. A. Herman in paper No. 299, "Laminated Soft Magnetic Materials", The Electrochemical Society Conference, Hollywood, Fla. October 1989. The deleterious edge-closure domains take longer time to move than to rotate the 180° (easy axis) domains. They thus cause noise due to their delayed response. The SNR degradation related to the edge-closure domains is proportional to their fraction of the entire domains in the pole-tips. With the conventional prior-art pole-tips, the SNR degradation increases as the pole-tip's width shrinks and approaches twice the size of the edge-closure domains. With the pinched pole-tips of this invention, most of the edge-closure domains are eliminated by the shorted sides and side-edges.

Figure 14A:
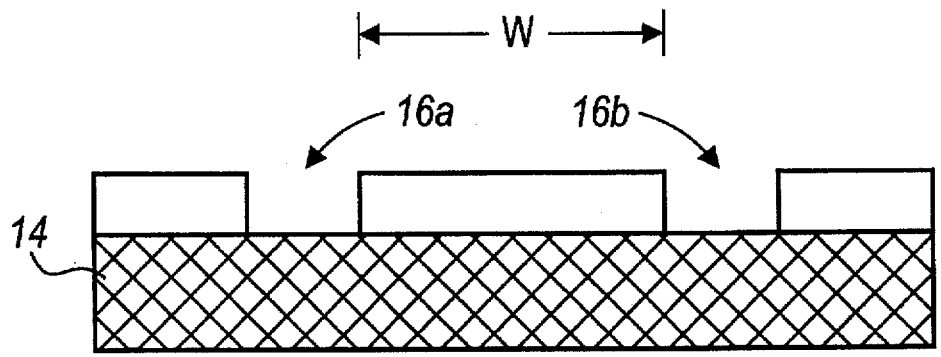
FIGS. 14a–14c illustrate a method of forming a pinched-gap structure with a wide bottom pole-tip, such as required in MMR devices, as seen from the ABS.
Figure 14B:
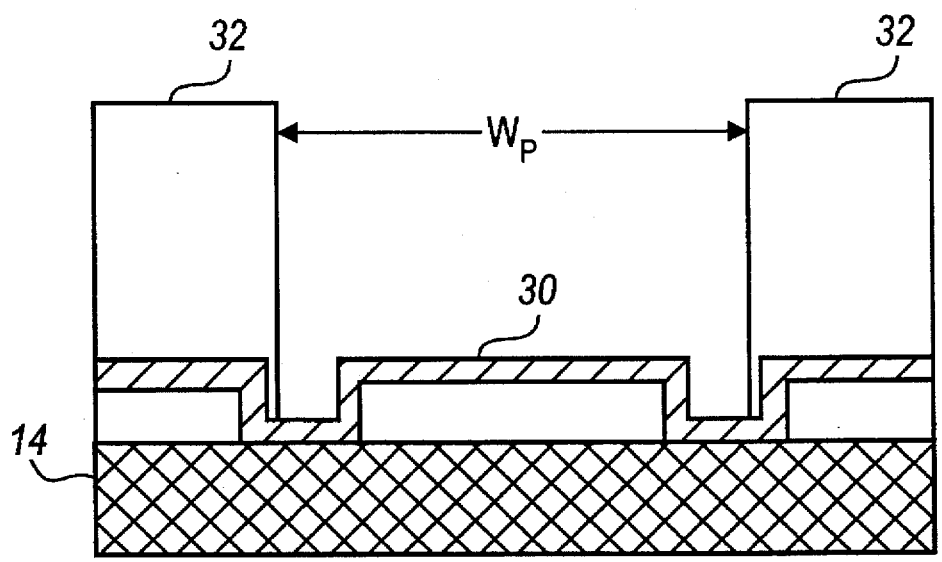
Figure 14C:
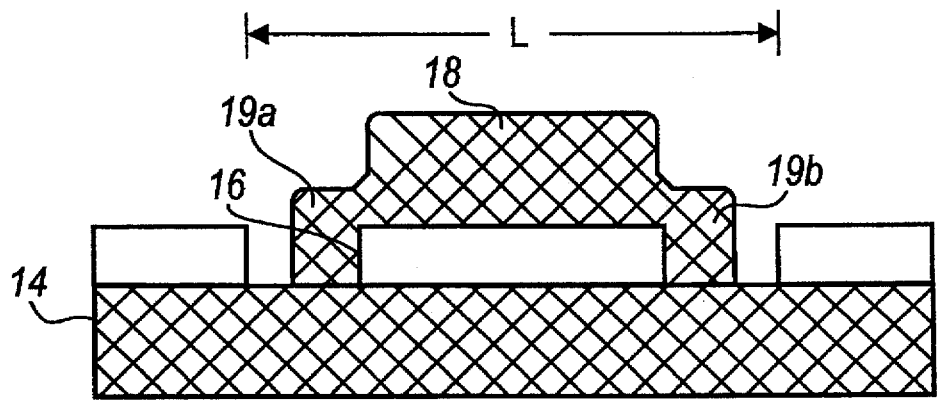

In a preferred embodiment of the invention, one pole-tip (usually the bottom one) of the pinched-gap device is much wider than the other. Such a configuration can be found in a merged MR (MMR) device, or it may be advantageous to use in a regular inductive head. The wider pole-tip enables simple and straightforward fabrication, without the need for pole-trimming or additional masks. FIGS. 14a–14c show an air bearing surface (ABS) view demonstrating a simple fabrication technique, using gap-vias, to obtain the pinched-gap structure over a wider bottom pole-tip. In order to simplify the drawing, features below the bottom pole-tip such as the substrate and undercoat (and bottom shield, read-gap, and MR element and contacts, in the case of MMR device) were excluded.

FIG. 14a shows the situation after gap-vias 16a and 16b were patterned and etched, followed by removal of the gap-etch mask. The gap-vias can be defined and etched in a similar process to the one described in FIG. 6 above. As described there, the pole-tip vias can be done at the same time and with a (modified) mask used to open the back gap-via (not shown). The latter is required to connect the backs of the bottom and top pole yokes. The distance W between the gap-vias 16a and 16b defines the width of the pinched-gap section 16, to be later formed in successive steps.

The next steps are shown in FIG. 14b. A seed-layer 30, such as Ni—Fe, is deposited (such as by sputtering) over the wafer, and a plating mask 32, such as a photoresist mask, is formed over seed-layer 30. However, if the top pole is to be deposited by a vacuum technique (such as sputtering or evaporation), then seed-layer 30 can be omitted. The opening $W_p$ in mask 32 determines the final width of the top pole-tip (including the side magnetic shunts). For proper functionality, the internal edges of mask 32 opening, at the pole-tip region, should be aligned within the gap-vias, as shown in FIG. 14b. Following the formation of plating mask 32, top magnetic pole 18 is plated through mask 32. Alternatively, top magnetic pole 18 can be deposited by a vacuum technique (such as sputtering or evaporation). In this case mask 32 is lifted-off following the top magnetic pole deposition.

In another alternative (not shown), top magnetic pole 18 is vacuum deposited or plated, without a mask, onto the configuration seen in FIG. 14a. Following the deposition of the top magnetic pole 18, an etch mask is formed over it. The alignment of the etch mask should protect the top pole-tip and shunts, as well as the back yoke. The outside edges of the etch mask, separated by a distance $W_p$ in the pole-tip region, should be located over gap-vias 16a and 16b. Following the formation of the etch mask, the wafer is subject to a dry etch (such as ion-milling or RIE) or to a wet chemical etch. For better precision, the dry etch technique is preferred. Adequate etch masks may comprise a metal or several metal layers and/or a photoresist layer.

FIG. 14c shows the completed pinched-gap section 16, following the deposition of the top magnetic pole 18 and the removal of mask 32 and seed-layer 30. It also shows the configuration following the removal of the etch mask (not shown), in the case of deposition of the top pole with no mask, and its etching through an etch mask). As seen in FIG. 14c, side shunts 19a and 19b are located within gap-vias 16a and 16b, respectively. The width $W_P$ of the top pole-tip including the shunts, should be smaller than the distance L between the outside edges of the gap vias, but larger than the distance W between the gap-vias (also the width of pinched-gap section 16): $W<W_P<L$. The techniques described in FIGS. 14a–14c are suitable to produce shunt widths in the range of 0.3–3.0 μm, and more preferably, in the range of 0.5–2.0 μm.

Figure 15A:
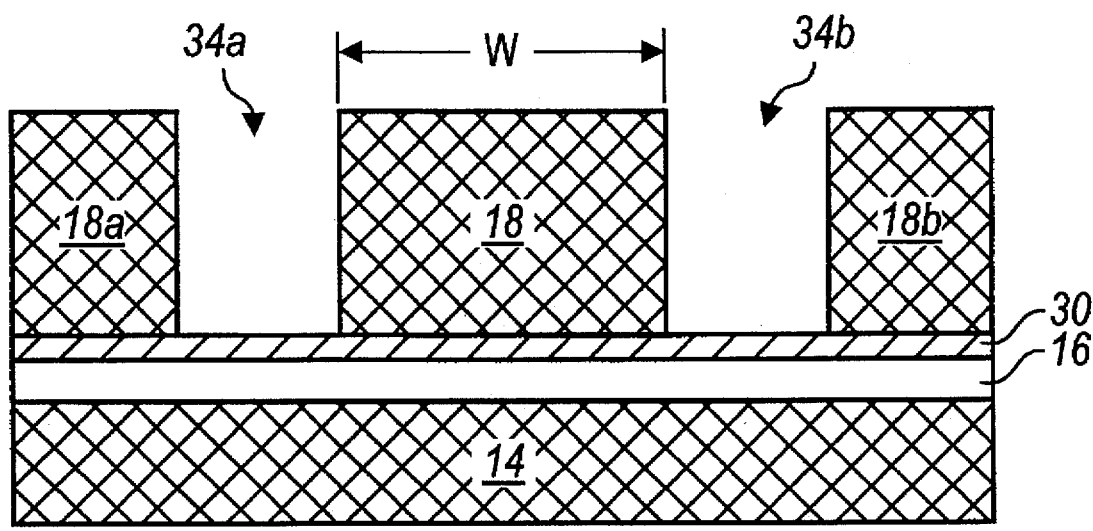
FIGS. 15a–15d illustrate an alternative method of forming a pinched-gap structure with a wide bottom pole-tip, such as required in MMR devices, as seen from the ABS.

FIGS. 15a–15d describe another convenient method for constructing pinched-gap structure with a wider bottom pole-tip. The method is particularly suitable for obtaining relatively narrow, self-aligned side magnetic shunts. The technique can provide a shunt width in the range of 0.05–1.0 μm, and more preferably, in the range of 0.1–0.5 μm. FIG. 15a shows (from ABS view) the situation after usual plating of the top pole (including pole-tip 18) through a frame (or "moat") plating mask, followed by removal of the plating mask. The latter was located in frame areas designated as 34a and 34b. Prior to forming the plating mask, a seed-layer 30, such as Ni—Fe, was deposited over gap layer 16. During the plating of top magnetic pole 18, other areas, 18a and 18b, outside frame (or moat) areas 34a and 34b, were also plated with the same magnetic material. These areas are referred to as the field plated areas. The plated magnetic pole(s) and the field may comprise a soft ferromagnetic alloy, such as Ni—Fe. Plated top pole-tip 18 and the field areas 18a and 18b can be used as a self-aligned mask for etching the gap 16 in frame areas 34a and 34b. However, prior to etching the gap in these areas, seed-layer 30 must be removed in these areas. This can be accomplished by either a short dry or wet etch. In the case of dry etch, it may comprise a sputter etch, ion-milling, or a RIE technique. In the case of a wet etch, it may comprise a short dip or spray in a suitable chemical etch. A dry etch is preferred, since it offers better control and consistency. Next, the gap in frame areas 34a and 34b is etched using pole-tip 18 and field areas 18a and 18b as a self-aligned mask. Again, the gap can be etched either by a dry technique (ion-milling, RIE, or sputter-etch) or by a wet technique. In the first case, RIE is the preferred method, since it leaves relatively straight walls and provides minimal attack on the plated top pole-tip 18, field areas 18a and 18b, and bottom pole-tip 14 (once exposed to the etching). However, wet etching might be a better method since it also highly selective (does not attack the plated poles and field areas) and is very fast and economic. A convenient wet etchant comprises one (1) volume of concentrated HF (48 wt %) diluted in nine (9) volumes of pure water (10% v/v). Etching can be carried out by immersion or by spray. However, being isotropic, wet etching of the gap produces some undercutting of gap layer 16 (under top pole-tip 18).

Figure 15B:
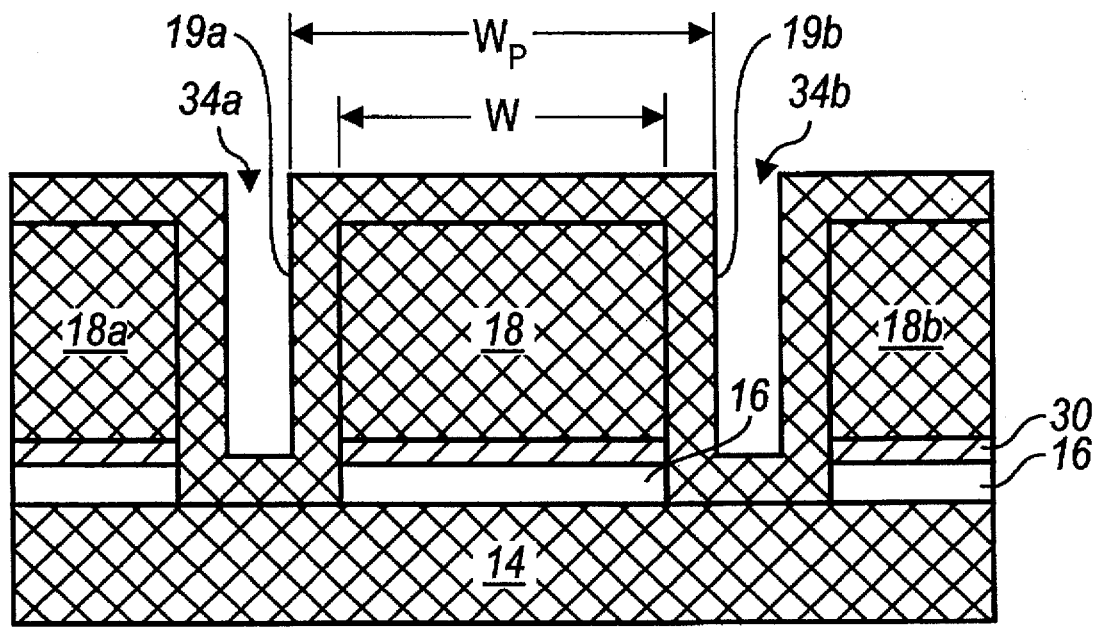

FIG. 15b shows the stage after gap 16 was etched in frame areas 34a and 34b and a new soft ferromagnetic seed-layer 19 was deposited over the structure. Ferromagnetic seed-layer 19 can be deposited by a vacuum technique such as sputtering or evaporation. Following the deposition of ferromagnetic seed-layer 19, the width of magnetic side shunts 19a and 19b can be readily fortified (or increased) by plating more ferromagnetic material(s) over the seed-layer. Although it may be more convenient to form ferromagnetic seed-layer 19 and the fortifying plated layer of the same material used for the top pole-tip, other ferromagnetic materials may offer better matching of the shunt reluctance to the pinched-gap reluctance. Thus, ferromagnetic materials with lower permeability than that of the pole-tips will increase the shunt reluctance. Either the seed-layer alone and/or the fortifying plated ferromagnetic layer may be different than the magnetic material(s) used in the pole-tips. A convenient ferromagnetic material for the pole-tips and for the shunts comprises permalloy Ni—Fe alloy. Different ferromagnetic materials may be used to construct top and bottom pole-tips 14 and 18.

Figure 15C:
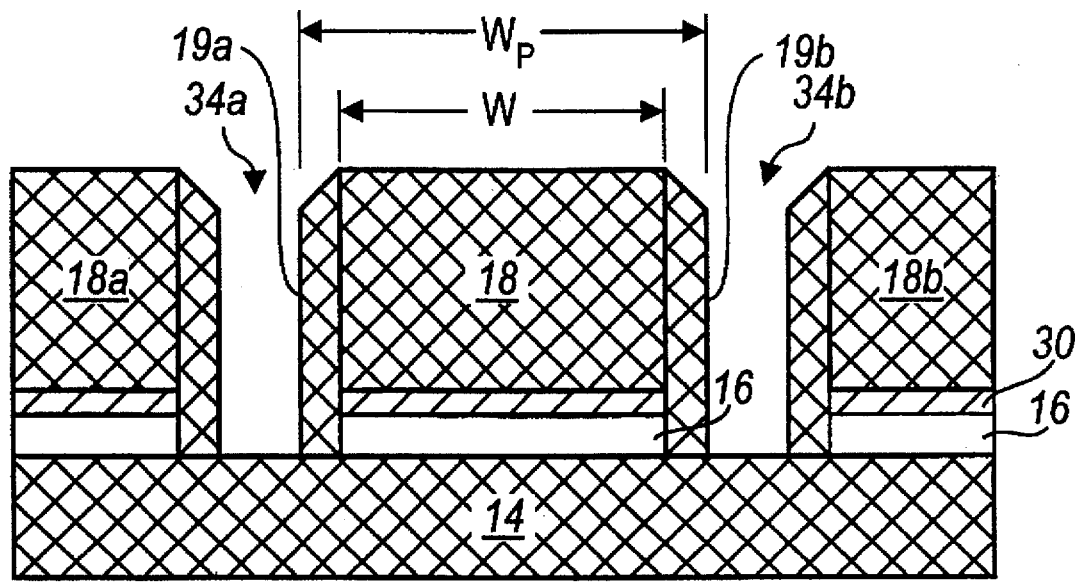

FIG. 15c shows the stage after ion-milling (the preferred technique due to its highly directional action, thereby leaving the side shunts 19a and 19b essentially untouched). The ion-milling is used to remove ferromagnetic seed-layer and (if used) fortifying plated layer 19 from frame areas 34a and 34b. Side magnetic shunts are now defined with a shunt width $(W_P-W)/2$. A field-etch mask (not shown) is formed over top pole-tip 18 and side shunts 19a and 19b, as well as over frame areas 34a and 34b. The wafer is then subjected to a field-etch that removes plated field areas 18a and 18b and their side layers 19. The field-etch is conveniently carried out by immersion or by spray in an appropriate chemical, such as acidic ammonium persulfate, or by a dry technique, such as ion-milling or RIE. The order of operations described above can be reversed, i.e, the field-etch operation can precede the operation of ion-milling removal of the seed-layer 19 and (if used) the fortifying plated layer from frame areas 34a and 34b.

The field-etch operation is preferably performed by a wet etch, in which case a protective thin layer (not shown) such as Au or Cu may be required. Such a protective layer can be deposited by plating (preferably) or by vacuum deposition, over the structure shown in FIG. 15b, or over the structure shown in FIG. 15c. The purpose of the protective layer is to protect bottom pole-tip 14 against attack (i.e, undercutting) in frame areas 34a and 34b. Following deposition of the protective layer, the field-etch mask is formed over the top pole-tip, side shunts, and frame areas 34a and 34b. Prior to the field-etch operation, the protective layer in the exposed areas (over field areas 18a and 18b) is removed by a wet selective etching or by sputter etching or by ion-milling. The wafer is then subjected to the field-etch. Using this scheme, it is preferable to reverse the order of operations, where the field-etch operation precedes the step of ion-milling of the material of the seed-layer 19 in frame areas 34a and 34b.

Figure 15D:
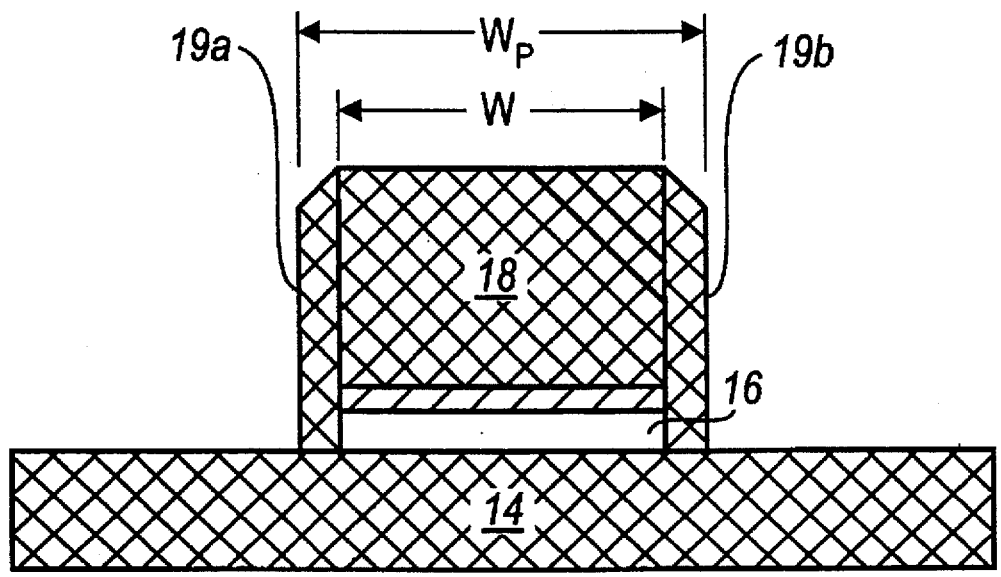

FIG. 15d shows the final stage with the fully constructed pinched-gap structure and a wide bottom pole-tip.

EXAMPLES

Example 1

A pinched-gap TFH device was fabricated using a top pole-tip that is wider than the bottom pole-tip and by wraparound on both side-edges, as shown in FIG. 7. No further attempt was made to expose the side-edges of the bottom pole-tip. Virtual contacts along the bottom pole-tip's side-edges were established due to the poor step coverage of the gap layer there. The device performance was compared with a conventional TFH device having the same bottom pole-tip width and narrower top pole-tip. The heads were used for both the write and the read functions. Significant reduction of the track-edge fringing noise was observed for the pinched-gap device. The track definition was substantially improved, and its width slightly decreased. The read-back signal of the pinched-gap device was somewhat decreased, but the device could still be used as a reader.

Example 2

Gap-vias were defined by photolithography, as in FIGS. 6 and 9. Metallic layer 20 consisted of 300 Å thick sputter-deposited permalloy (Ni—Fe). Gap layer 16 consisted of 0.8 µm thick sputter-deposited Al$_2$O$_3$. The via pattern was transferred to the permalloy layer 20 by etching the permalloy, through photoresist mask 22, with an (1:1:8) etchant comprising:

| Nitric Acid (conc.) | HNO$_3$ | 1 volume |
|---|---|---|
| Phosphoric Acid (conc.) | H$_3$PO$_4$ | 1 volume |
| Water | H$_2$O | 8 volumes |

Etching was performed at room temperature by dipping the wafers in the etchant with moderate agitation. Visual inspection after 2 minutes of etching, indicated completion of the permalloy etching in the via areas. Probe measurement in these areas exhibited extremely high electrical resistance, further indicating the completion of etching the permalloy layer 20. To check the latitude of the process, etching times as long as 10 minutes were tried, with excellent fidelity and no visible undercutting or any other problem. This constitutes a safe overetch time of at least 400% with no visible undercutting. The etch rate of permalloy layer 20 through the mask was at least 150 Å/min. Next, the wafers were rinsed in pure water, and the exposed gap areas were etched through the etch mask (combined of the photoresist and the permalloy layers). The etchant comprised:

| Hydrofluoric Acid (48%) | HF | 1 volume |
|---|---|---|
| Water | H$_2$O | 9 volumes |

Etching was performed by spraying the etchant at room temperature. Both visual inspection and electrical probe measurements (resistance of about 1–3 Ohms) indicated completion of the gap-vias etching after 3 minutes. To check the latitude of this process, etching times as long as 9 minutes were tried with high fidelity and no visible undercutting. This constitutes a safe overetch time of at least 200%. The etch rate of the gap-vias under these conditions was about 2,700 Å/min. Following the completion of etching the gap-vias, the wafers were rinsed in pure water and photoresist layer 22 was stripped by dipping in a commercial stripper. Next, permalloy layer 20 was removed by either a brief sputter-etching or by dipping in the 1:1:8 etchant (comprising nitric acid, phosphoric acid, and water) at room temperature. In the latter case it only took about 30 seconds to remove the unmasked permalloy layer. This corresponds to etch rate of about 600 Å/min for the unmasked permalloy layer 20. Occasionally, this etchant caused pin-holes and small craters in relatively large exposed areas of the permalloy bottom pole 14. Such larger exposed areas are used for other purposes, such as lapping guides or test features. To avoid this problem, very brief sputter-etching or ion-milling is preferred for the removal of permalloy layer 20. However, these techniques slightly attack the gap layer, after metallic layer 20 is removed. Using thinner permalloy layer, such as 100 Å thick, minimizes both wet and dry etching time and the associated deleterious effects. The preferred process calls for 100 Å thick permalloy layer 20, and its removal by brief sputter-etching of less than 30 seconds.

Although examples and detailed embodiments were described for a pinched-gap thin film head (TFH), other devices, such as ferrite metal in gap (MIG) heads, horizontal (such as planar silicon) heads, tape heads, and perpendicular recording heads may also comprise the pinched-gap structure. The pinched-gap structure in all these devices is facilitated by confining (or enclosing) a pinched-gap section between two side magnetic shunts.

While the invention has been particularly described with reference to preferred embodiments, it will be understood by those skilled in the art that various changes in form and detail may be made therein without departing from the spirit, scope, and teaching of the invention. Accordingly, examples herein disclosed are to be considered merely as illustrative and the invention to be limited only as specified in the claims.

I claim:

1. A thin film head (TFH) comprising a pinched-gap inductive magnetic transducer device, said device comprising:

a substrate;

a bottom magnetic pole deposited over said substrate, said bottom magnetic pole comprising a back-portion and a bottom pole-tip;

a non-magnetic gap layer deposited over said bottom magnetic pole;

a top magnetic pole deposited over said gap layer, said top magnetic pole comprising a back-portion and a top pole-tip, said back-portion of said top magnetic pole being connected to said back-portion of said bottom magnetic pole;

both of said pole-tips terminating at a surface which is to be located adjacent a magnetic recording medium when said device is writing data;

said top pole-tip and said bottom pole-tip being in substantial contact with each other in two areas so as to define a pinched-gap segment of said gap layer in a central region between said two areas of substantial contact, a width of one of said pole-tips being greater than a width of the other of said pole-tips;

whereby a magnetic reluctance between said pole-tips in said areas of substantial contact is substantially lower than a magnetic reluctance between said pole-tips across said pinched-gap segment, thereby substantially preventing magnetic flux lines from spreading laterally outward from said two areas of substantial contact and thereby preventing the creation of significant track edge noise in a data track written by said device.

2. The TFH of claim 1 further comprising a magnetoresistive (MR) device, said wider pole-tip comprising at least a portion of a magnetic shield for a read element in said MR device.

3. The TFH of claim 2 wherein said inductive magnetic transducer device and said MR device are positioned in tandem, with one of said devices being on top of the other of said devices.

4. The TFH of claim 1 further comprising a magnetoresistive (MR) device, a magnetic shield for a read element in said MR device comprising at least a portion of said wider pole-tip.

5. The TFH of claim 1 wherein a magnetic shunt is positioned in each of said two areas of substantial contact.

6. The TFH of claim 5 wherein said magnetic shunt comprises a material that is different from a material comprised in at least one of said pole-tips.

7. The TFH of claim 6 wherein said top pole-tip comprises a material different from a material comprised in said bottom pole-tip.

8. The TFH of claim 5 wherein a depth of the magnetic shunt extends from a front end of said pole-tips to zero-throat-height.

9. The TFH of claim 5 wherein a depth of the magnetic shunt extends to a location between zero-throat-height and a front end of said pole-tips.

10. The TFH of claim 1 wherein said two areas of substantial contact function to prevent significant side-edge fringing when said TFH is in a normal write operation.

11. The TFH of claim 10 wherein said pole-tips contact each other in said two areas.

12. The TFH of claim 1 wherein a separation between the pole-tips in said two areas of substantial contact is less than 5% of a thickness of the gap layer between the pole-tips across said pinched-gap segment in said central region.

13. A pinched-gap magnetic recording head comprising:
   first and second magnetic pole-tips, said first and second magnetic pole-tips terminating at a surface which is to be located adjacent a magnetic recording medium when said head is writing data;
   a nonmagnetic transducing gap separating said pole-tips, said transducing gap being confined by a pair of side magnetic shunts, said transducing gap being located in a central region between said side magnetic shunts, wherein each of said side magnetic shunts is in substantial contact with both of said pole-tips throughout a region beginning at said surface and extending along said pole-tips away from said surface, and wherein a magnetic reluctance between said pole-tips through said magnetic shunts is substantially lower than a magnetic reluctance between said pole-tips across said transducing gap, thereby substantially preventing magnetic flux lines from spreading laterally outward from said pole-tips and thereby preventing the creation of significant track edge noise in a data track written by said magnetic recording head.

14. The pinched-gap recording head of claim 13 wherein each of said side magnetic shunts is in substantial contact with the side-edges of at least one of said pole-tips.

15. The pinched-gap recording head of claim 1 or claim 13 wherein said head is selected from a group consisting of thin film heads, metal in gap heads, horizontal heads, planar silicon heads, tape heads, and perpendicular recording heads.

16. A pinched-gap magnetic recording head comprising:
   first and second magnetic pole-tips, said first and second magnetic pole-tips terminating at a surface which is to be located adjacent a magnetic recording medium when said head is writing data;
   a nonmagnetic gap layer separating said pole-tips;
   said pole-tips being in substantial contact with each other in two areas so as to define a pinched-gap segment of said gap layer in a central region between said areas of substantial contact, said areas of substantial contact beginning at said surface and extending a distance along said pole-tips away from said surface, a thickness of said gap layer being such that a transducing gap is formed between said pole-tips in said central region, there being no third magnetic pole-tip located between said first and second magnetic pole-tips within said central region, a width of said first magnetic pole-tip being greater than a width of said second magnetic pole-tip;
   whereby a magnetic reluctance between said pole-tips in said areas of substantial contact is substantially lower than a magnetic reluctance between said pole-tips across said transducing gap, thereby substantially preventing magnetic flux lines from spreading laterally outward from said pole-tips and thereby preventing the creation of significant track edge noise in a data track written by said device.

17. The pinched-gap magnetic recording head of claim 16 wherein a separation between the first and second magnetic pole-tips in each of said two areas of substantial contact is less than 5% of a thickness of said gap layer between said first and second magnetic pole-tips in said central region.

18. A thin film head (TFH) comprising a pinched-gap inductive magnetic transducer device, said device comprising
   a substrate;
   a bottom magnetic pole formed over said substrate, said bottom magnetic pole comprising a back-portion and a bottom pole-tip;
   a non-magnetic gap layer formed over said bottom magnetic pole;
   a top magnetic pole formed over said gap layer, said top magnetic pole comprising a back-portion and a top pole-tip, said back-portion of said top magnetic pole being connected to said back-portion of said bottom magnetic pole, both of said pole-tips terminating at a surface which is to be located adjacent a magnetic recording medium when said device is writing data;
   said top pole-tip and said bottom pole-tip being in substantial contact with each other in two areas so as to define a pinched-gap segment of said gap layer in a central region between said two areas of substantial contact, said areas of substantial contact beginning at said surface and extending a distance along said pole-tips away from said surface;
   whereby a magnetic reluctance between said pole-tips in said areas of substantial contact is substantially lower than a magnetic reluctance between said pole-tips across said pinched-gap segment, thereby substantially preventing magnetic flux lines from spreading laterally outward from said pole-tips and thereby preventing the creation of significant track edge noise in a data track written by said device.

19. The head of claim 14, 16 or 18 further comprising a magnetoresistive (MR) device.

20. The head of claim 19 wherein said pole-tips are comprised in an inductive magnetic transducer device, said inductive magnetic transducer device and said MR device being positioned in tandem, one of said devices being on top of the other of said devices.

21. The head of claim 20 wherein said MR device includes top and bottom magnetic shields, said top magnetic shield comprising at least a portion of one of said pole-tips.

* * * * *